(No Model.)

T. STAHLER.
Milk-Cooler.

No. 228,412. Patented June 1, 1880.

Witnesses.
A. Ruppert
Jas. H. Lang

Tilghman Stahler.
Inventor:
per Edson Bros.
Attorneys

UNITED STATES PATENT OFFICE.

TILGHMAN STAHLER, OF ZIONSVILLE, PENNSYLVANIA.

MILK-COOLER.

SPECIFICATION forming part of Letters Patent No. 228,412, dated June 1, 1880.

Application filed March 9, 1880. (No model.)

*To all whom it may concern:*

Be it known that I, TILGHMAN STAHLER, of Zionsville P. O., in the county of Lehigh and State of Pennsylvania, have invented certain new and useful Improvements in Milk-Coolers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The nature of my invention consists in the construction and arrangement of a device for expediting the passing off of animal heat and vapor from milk, as will be hereinafter more fully set forth, and pointed out in the claim.

Figure 1:
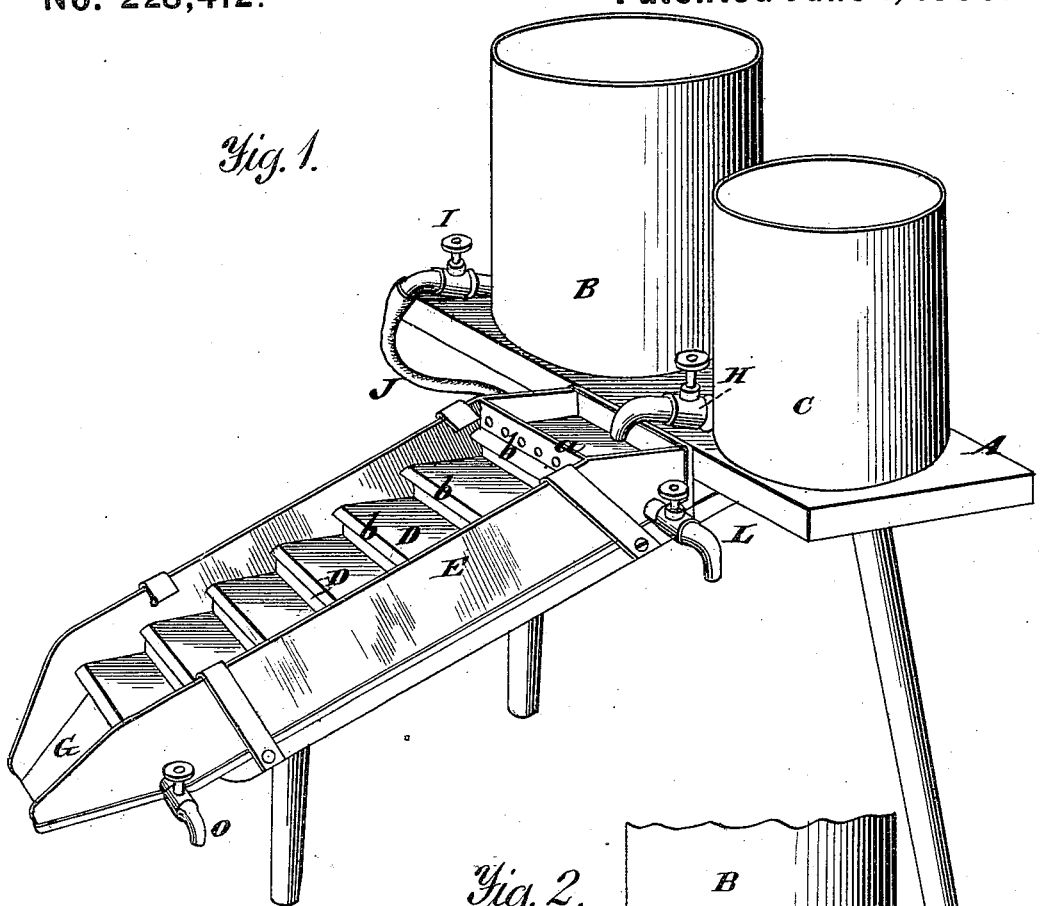
Figure 2:
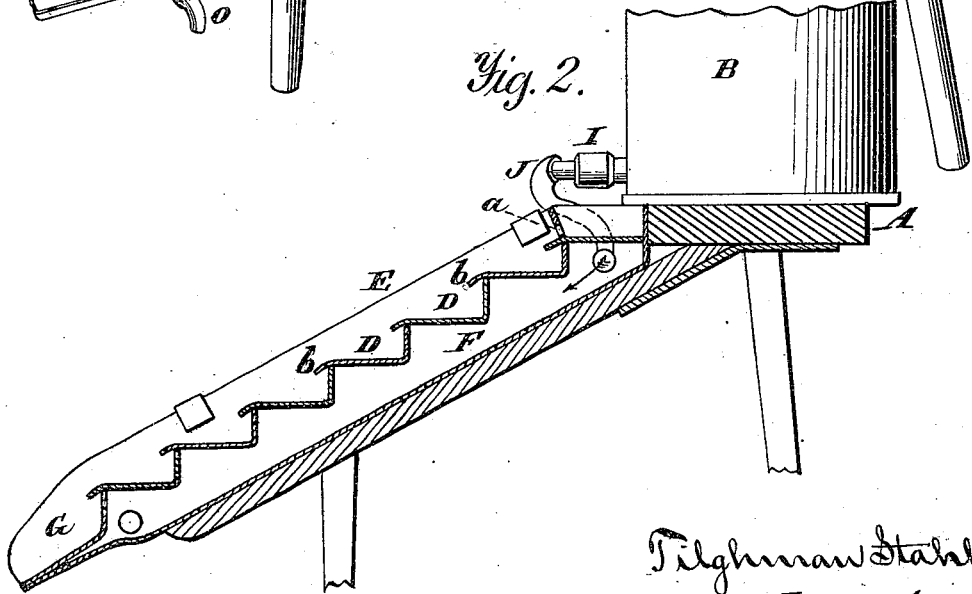

In the annexed drawings, which fully illustrate my invention, and to which reference is made, Figure 1 is a perspective view of my invention, and Fig. 2 is a longitudinal vertical section of the same.

A represents a bench or other suitable support, upon which are placed two tanks, B and C. From the center of the support A extends an inclined casing or trough, E, within which is made a series of steps, D, as shown, and below said steps is a chamber, F, having its top portion corresponding with the shape or formation of the steps, while its bottom is made on an incline.

The lower end of the casing E forms a contracted spout, G, as shown in Fig. 1, while at the forward end of the first or top step is a raised ledge or flange, a, having a series of holes or perforations through it, of any desired size and shape.

The tank C is supposed to contain the milk, and has a suitable faucet, H, for allowing the milk to pass from said tank onto the first or upper step, D. The perforated flange at the front edge of this step retards the flow of the milk, and causes it to be evenly distributed onto the next step, and from this step it flows onto the next, and so on, until it passes out through the spout G into some vessel placed to receive it.

It is evident that a perforated flange, a, may be arranged at the front edge of any one or more or all of the other steps to retard and distribute the milk. Hence I do not confine myself to using the same on the top step only.

Each step in the series forms an inclined or curved overhanging ledge, as shown at b, to facilitate the passage of the milk from one step to the next.

The tank B is supposed to contain water, and has a faucet, I, and hose J, connecting with the upper end of the chamber F. In this upper end of said chamber is also an air-vent, L. At the lower end of the chamber is an outlet-faucet, O.

The tank B being filled with water and the tank C with milk, the faucet I and air-vent L are first opened, which allows the water to flow into and fill the chamber F. The fact that this chamber is full is evidenced by the water coming out of the air-vent L, which is then closed.

The faucet H is opened and the milk allowed to flow over the steps, as already stated, and the water-outlet faucet O opened, which causes a continuous change of the water under the steps while the milk is flowing over them; and by this means all the animal heat and vapor passes from the milk.

Where a spring or other stream of running water is convenient, the tank B may be dispensed with and the water simply conducted by any suitable or convenient means into the upper end of the chamber F. Still, even then it might be of benefit to use such a tank, as it would insure a uniform flow and pressure of the water.

Having thus fully described my invention, what I claim as new, and desire to secure by Letters Patent, is—

The combination of a milk-tank, C, water-supply B, steps D, with chamber F underneath, the inlets H I, air-vent L, and water-outlet O, all constructed substantially as and for the purposes herein set forth.

In testimony that I claim the foregoing I have hereunto set my hand this 1st day of March, 1880.

TILGHMAN STAHLER.

Witnesses:
HENRY S. STAUFFER,
SAMUEL STAUFFER.